United States Patent
Yamada et al.

(10) Patent No.: US 6,421,630 B1
(45) Date of Patent: Jul. 16, 2002

(54) VDT OPERATION MONITORING APPARATUS AND METHOD FOR MONITORING

(75) Inventors: Yoshiro Yamada; Kenichi Hamazaki; Tetsuo Higano, all of Tochigi (JP)

(73) Assignee: Sony Chemicals Corp., Tokyo (JP)

( * ) Notice: Subject to any disclaimer, the term of this patent is extended or adjusted under 35 U.S.C. 154(b) by 0 days.

(21) Appl. No.: 09/407,978

(22) Filed: Sep. 29, 1999

(30) Foreign Application Priority Data

Oct. 7, 1998 (JP) .......................................... 10-284679

(51) Int. Cl.[7] ................................................ G04F 1/00
(52) U.S. Cl. ........................ 702/177; 702/176; 713/324; 324/121 R
(58) Field of Search ................................ 702/177, 178, 702/182, 176; 713/324; 324/121

(56) References Cited

U.S. PATENT DOCUMENTS 4,536,707 A * 8/1985 Herweg .................. 324/121 R
5,404,541 A * 4/1995 Hirosawa et al. ............ 713/324
5,792,025 A   8/1998 Kikinis
5,888,173 A   3/1999 Singhal
5,991,705 A * 11/1999 Klein et al. .................. 702/176

FOREIGN PATENT DOCUMENTS

JP   61-187090   8/1986
JP    5-173663   7/1993
JP    5-298316  11/1993

* cited by examiner

Primary Examiner—Marc S. Hoff
Assistant Examiner—Mohamed Charioui
(74) Attorney, Agent, or Firm—Oliff & Berridge, PLC

(57) ABSTRACT

There is provided an apparatus and method for monitoring a VDT operation which allow flexible control over a VDT.

A VDT operation monitoring apparatus for putting a VDT in a rest state when a preset operating time passes, with which an operator can select "start operation", "continue operation" or "stop operation" while the operating time is being measured. This allows a flexible action to be taken when the operator is replaced or when the operating time is to be changed. When a measured time agrees with the operating time, the VDT is put in a rest state and the operator is instructed to take a rest.

12 Claims, 4 Drawing Sheets

VDT OPERATION MONITORING APPARATUS AND METHOD FOR MONITORING

BACKGROUND OF THE INVENTION

1. Field of the Invention

The present invention relates to the field of apparatuses and methods for monitoring operations carried out utilizing VDTs (visual display terminals) such as personal computers, word processors and workstations.

2. Description of the Related Art

In these days, a variety of electronic apparatuses utilizing VDTs have widely spread not to speak of personal computers, word processors and workstations, and VDT operations have become quite popular. As is well known, an operator at a VDT operation can suffer from physical problems such as eye fatigue, stiff shoulders and headache after viewing the VDT screen for a long period of time continuously. Therefore, an operator at a VDT must take a rest periodically on his or her own judgement to keep the health.

However, some VDT operations must be conducted intensively for reasons including the nature of the tasks and time limits. As a result, VDT operations may be performed for a long time in unconsciousness of time, which has resulted in physical problems as described above.

For example, prior techniques to solve this problem include the apparatus for limiting the time of continued use of a VDT disclosed in Japanese unexamined patent publication (KOKAI) No. S61-187090 and the electronic apparatus disclosed in Japanese unexamined publication (KOKAI) No. H5-173663.

Referring first to the apparatus for limiting the time of continued use of a VDT disclosed in Japanese unexamined patent publication (KOKAI) No. S61-187090, it repeats an operation in which the operating time of a VDT is measured to detect that a VDT operation has continued for a predetermined time; the operator is notified of a time to rest with the operation of the VDT temporarily stopped by force; the rest time is measured to detect that a predetermined rest time has been spent; the measurement of the VDT operating time and the rest time is reset; and the operation of the VDT is resumed.

With the apparatus for limiting the time of continued use of a VDT disclosed in said publication, means for performing the above-described operation makes it possible to set a rest time automatically upon the detection of the fact that the a VDT has been operated for a predetermined time and to notify the operator of the time to rest. This provides a countermeasure to fatigue of eyes which is the most serious problem with VDT operations, and this is quite effective in preventing problems to the health of an operator because the health care is compulsory rather than self-motivated.

However, VDT operations often involve replacement of operators. A problem arises with the apparatus for limiting the time of continued use of a VDT disclosed in said publication in that no consideration is paid as to whether the measurement of a VDT operating time is to be reinitiated after a reset or to be continued without a reset in such a case. Further, since the VDT operation is forcibly stopped, there has been no way to continue an urgent operation selectively.

With the electronic apparatus disclosed in Japanese unexamined patent publication (KOKAI) No. H5-173663, an arbitrary time is set with a time setting dial; the presence of an operator in front of the VDT is detected with a sensor; time measurement with a timer is initiated if an operator is present; time measurement with the timer is stopped if no operator is present; and, when the time measured by the timer coincides with the time set with the time setting dial, audible and visual indications are provided to notify the operator of that time.

With the electronic apparatus disclosed in said publication, the presence of an operator in front of a VDT is detected with a sensor, and the operating time of the VDT is measured with a timer. It is therefore possible for a VDT operator to have an accurate understanding of the time during which he or she has faced the electronic apparatus (operating time). However, since the presence of an operator in front of a VDT does not necessarily mean that the operator is performing a VDT operation, a problem has existed in that it is actually difficult to know the operating time of a VDT.

The present invention has been devised to solve the above-described problems with the prior art, and it is an object of the invention to provide an apparatus and method for monitoring a VDT operation which allow each of a plurality of operators using a VDT by turns to know the operating time of the VDT accurately.

SUMMARY OF THE INVENTION

In order to solve the above-described problems, according to the invention, there is provided a VDT operation monitoring apparatus comprising time measuring means for measuring time, control means for detecting a time measured by the time measuring means and notification means for providing notification of desired information under the control of the control means, which is configured such that the VDT is put in a rest state when the control means detects that a preset operating time has passed. The VDT operation monitoring apparatus further comprises operation selecting means for allowing any one of the states of starting, continuing and stopping an operation to be selected while the time measurement is being conducted, and comprises the control means determines the state of the VDT in accordance with the selection.

According to the invention, there is provided a VDT operation monitoring apparatus comprising the control means initializes the time measuring means when the selection to start an operation is made.

According to the invention, there is provided a VDT operation monitoring apparatus comprising the control means puts the VDT operation monitoring apparatus in a rest state when the selection to stop an operation is made.

According to the invention, there is provided a VDT operation monitoring apparatus comprising the control means causes the notification means to provide a notification of the fact that a time measured by the time measuring means has exceeded a preset time to rest.

According to the invention, there is provided a VDT operation monitoring apparatus comprising the operation selecting means allows a selection as to whether an operation is to be resumed or not when a preset rest time has passed.

According to the invention, there is provided a VDT operation monitoring apparatus as described above comprising an electronic apparatus including a VDT and a software program operating on the electronic apparatus.

According to the invention, there is provided a method for monitoring a VDT operation comprising the steps of measuring a time during which an VDT is in operation, putting the VDT in a rest state when the measured time exceeds a preset operating time, allowing an operator to select any one of alternatives, i.e., starting, continuing and stopping the operation and determining the state of the VDT in accordance with the selection.

According to the method for monitoring a VDT operation of the invention, the measured time can be initialized to resume the measurement when the selection to start the operation is made.

According to the method for monitoring a VDT operation of the invention, the VDT can be put in a rest state when the selection to stop the operation is made.

According to the method for monitoring a VDT operation of the invention, it is possible to measure time after the rest state is entered and to cause the VDT to indicate the fact that the time has exceeded a preset rest time.

According to the method for monitoring a VDT operation of the invention, the operator can make a selection as to whether to resume the operation when the rest time has passed.

According to the invention, there is further provided a method comprising a first step of measuring a time during which a VDT is in operation, a second step of putting the VDT in a rest state when the measured time exceeds a preset operating time, a third step of allowing the operator to select any one of alternatives, i.e., starting, continuing and stopping the operation after the rest state is entered, a fourth step of determining the state of the VDT in accordance with the selection and a fifth step of recording at least the first through fourth steps, and there is provided a recording medium which stores the first through fourth steps.

A VDT operation monitoring apparatus according the invention comprises as described above and includes time measuring means for measuring time, control means for detecting at least a time measured by the time measuring means and notification means for providing a notification of a desired information under the control of the control means.

The apparatus of the invention is configured such that a VDT is put in a rest state when the control means detects a measured time and determines that the measured time exceeds a present operating time. The term "rest state of a VDT" means a state in which an operator can not perform an operation utilizing a VDT and also implies states such as a state wherein a VDT indicates that it is in a rest state and a state wherein the screen of a VDT is off.

Further, there is provided operation selecting means to allow an operator to select any one of states, i.e., starting, continuing and stopping an operation while the operating time is being measured, and the control means is configured such that it determines the state of the VDT in accordance with the selection.

Therefore, a flexible action can be taken even during an operating time in situations becomes necessary, such as terminating operation, or entering a rest state or restarting of the measurement of the operating time when the operator is replaced.

When a rest state is entered and the rest time is passed, a standby state is entered. Therefore, a flexible action can be taken even in complicated situations, e.g., even when the rest time varies depending on operators or days the week.

DETAILED DESCRIPTION OF PREFERRED EMBODIMENT

An apparatus and method for monitoring a VDT operation according to the invention will now be described with reference to a preferred embodiment shown on the accompanying drawings.

Figure 1:
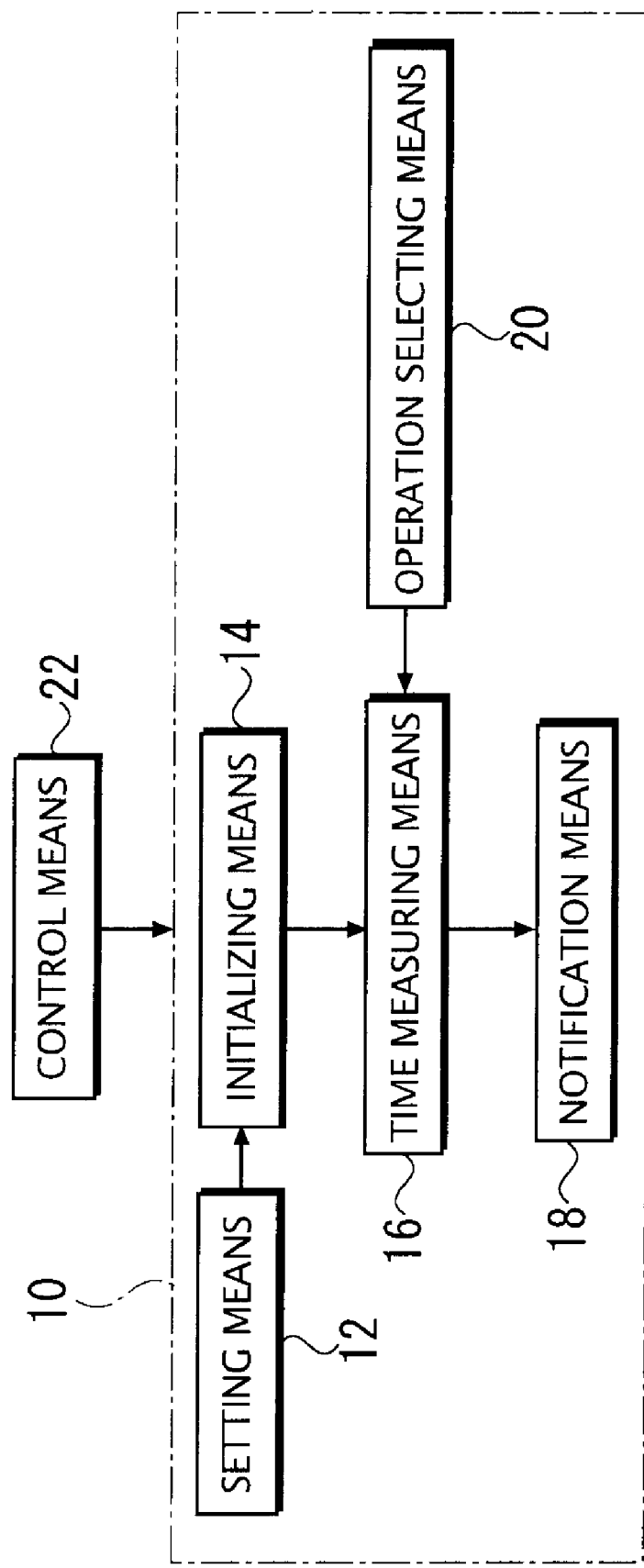
FIG. 1 is a block diagram illustrating the concept of an embodiment of a VDT operation monitoring apparatus according to the invention.

FIG. 1 is a block diagram illustrating the concept of an embodiment of a VDT operation monitoring apparatus according to the invention.

As shown in FIG. 1, a VDT operation monitoring apparatus 10 basically includes setting means 12, initializing means 14, time measuring means 16, notification means 18, operation selecting means 20 and control means 22.

In the setting means 12 of the VDT operation monitoring apparatus 10 is set in advance with an operating time during which an operator at a VDT performs an operation continuously and a rest time during which the operator is to take a rest after working for a time that is equal to the VDT operating time. For example, the VDT operating time and rest time are normally set at one hour and fifteen minutes, respectively.

The initializing means 14 initializes the time measuring means 16 to be described later based on the VDT (display screen) operating time and rest time set in the setting means 12.

Upon initialization by the initializing means 14, the time measuring means 16 starts to measure times corresponding to the VDT operating time and rest time. Specifically, it measures a time (which is assumed to be set at one hour here) that is equal to the VDT operating time when it is initialized for the VDT operating time and measures a time (which is assumed to be set at fifteen minutes) that is equal to the rest time when it is initialized for the rest time. The control means 22 is capable of detecting the completion of the measurement of the operating time or rest time.

The notification means 18 is controlled by the control means 22 and, when the times equal to the VDT operating time and rest time have been measured by the time measuring means 16, it notifies the operator of the fact (that the times equal to the operating time and rest time have been measured). While this notification may be in the form of an alarm message indicated on the VDT or an alarm tome or voice, other means of notification may be used. It is possible to use a display, speaker or the like other than the VDT which is already provided in the electronic apparatus including the VDT.

The operation selecting means 20 is configured such that it performs selective switching to start, continue or stop the operation of the VDT any time in response to a request from the operator. When the operator chooses to start the operation with the operation selecting means 20, the time measuring means 16 is initialized by the initializing means 14 for the VDT operating time, and measures a time to be exceeded.

When the operator chooses to continue the operation, the time measuring means 16 continues measuring the time.

When the operator chooses to stop the operation, the time measurement by the time measuring means 16 is completely stopped.

For example, operation starting is selected when a VDT operation is to be started with the time measurement by the time measuring means 16 reset or when a VDT operation is to be newly started with the operator replaced.

Continuation of an operation is selected when the time measurement by the time measuring means 16 is to be continued in a case that the operator wishes to resume the operation after a temporary interruption.

Operation stop is selected when an operation is to be stopped while the time measurement by the time measuring means 16 is in progress.

The control means 22 controls the operation of the VDT operation monitoring apparatus 10 in accordance with the contents of the operation selected with the operation selecting means 20.

In the VDT operation monitoring apparatus 10 according to the invention, the initializing means 14 first initializes the time measuring means 16 under the control of the control means 22 for the VDT operating time set in the setting means 12 in advance. The time measuring means 16 starts measuring a time that is equal to the VDT operating time and, when the time equal to the VDT operating time is measured, the notification means 18 notifies of the operator of the fact that a time that is equal to the VDT operating time has been measured.

The time measuring means 16 is then initialized for the rest time, and when a time that is equal to the rest time is measured, the operator is notified of the fact that a time that is equal to the rest time has been measured. This allows the operator to know the VDT operating time and rest time reliably. Further, since the contents of the operation can be switched with the operation selecting means 20 any time as needed, an operator can reliably know the VDT operating time and rest time even after a replacement of operators, and an urgent operation can be carried out continuously.

The VDT operation monitoring apparatus 10 according to the invention may have an integral configuration in which an electronic apparatus such as a personal computer, word processor or workstation is combined with software such as a VDT operation monitoring program and hardware operating on the electronic apparatus. Alternatively, it may have a separate type configuration which is a combination of an electronic apparatus including a VDT and hardware and software which are completely independent of the same.

A method for monitoring a VDT operation according to the invention will now be described with reference to the state transition diagram shown in FIG. 2 and the flow chart shown in FIG. 3 and by referring, by way of example, to a case wherein the invention is implemented in the form of an electronic apparatus including a VDT and a VDT operation monitoring program operating on the electronic apparatus.

First, the VDT operation monitoring program embodying the invention is automatically registered in a start-up group of an operating system (OS) such as the Windows 95/98 and Windows NT (which are registered trademarks of Microsoft Corporation) by executing an install program. The installed VDT operation monitoring program is automatically activated upon the activation of the operating system to reside and operate on the main memory.

The operation of the VDT operation monitoring program will be described with reference to the flow chart in FIG. 3. When activated, the VDT operation monitoring program itself is first initialized as shown at step $S_1$. More specifically, for example, the VDT operation monitoring program itself is represented by an icon to indicate that it resides on an end of the screen (task bar area), and the time measuring means 16 for measuring the VDT operating time and rest time is initialized at the VDT operating time to cause it to start an operation of counting down the VDT operating time.

The VDT operating time and rest time are stored in an external memory such as a hard disk in advance and is read into a semiconductor memory as the VDT operation monitoring program is executed. Referring to the form of storage of the same on the hard disk, while it may be written in a text file associated with the operating system or may alternatively be written as a data file separate from the operating system file, operator must be able to change the operating time and rest time stored therein any time.

After the initialization, the time measuring means 16 starts measuring time as shown at step $S_2$. When time measurement is started, the process proceeds to step $S_3$ to check with the control means 22 whether any mouse button or key is pressed.

If there is no press, the process returns to step $S_2$ to continue the time measurement and then proceeds to step $S_3$ again. Thus, a loop is formed between the steps $S_2$ and $S_3$ as long as there is no press.

This loop operation is performed until it is determined at step $S_2$ that the control means 22 detect the result of the time measurement agrees with the preset operating time. Until it happens, the VDT is in operation and the operator can freely perform a VDT operation.

During the VDT operation, the remaining VDT operating time is displayed on the icon of the VDT operation monitoring program shown on the task bar.

Figure 4:
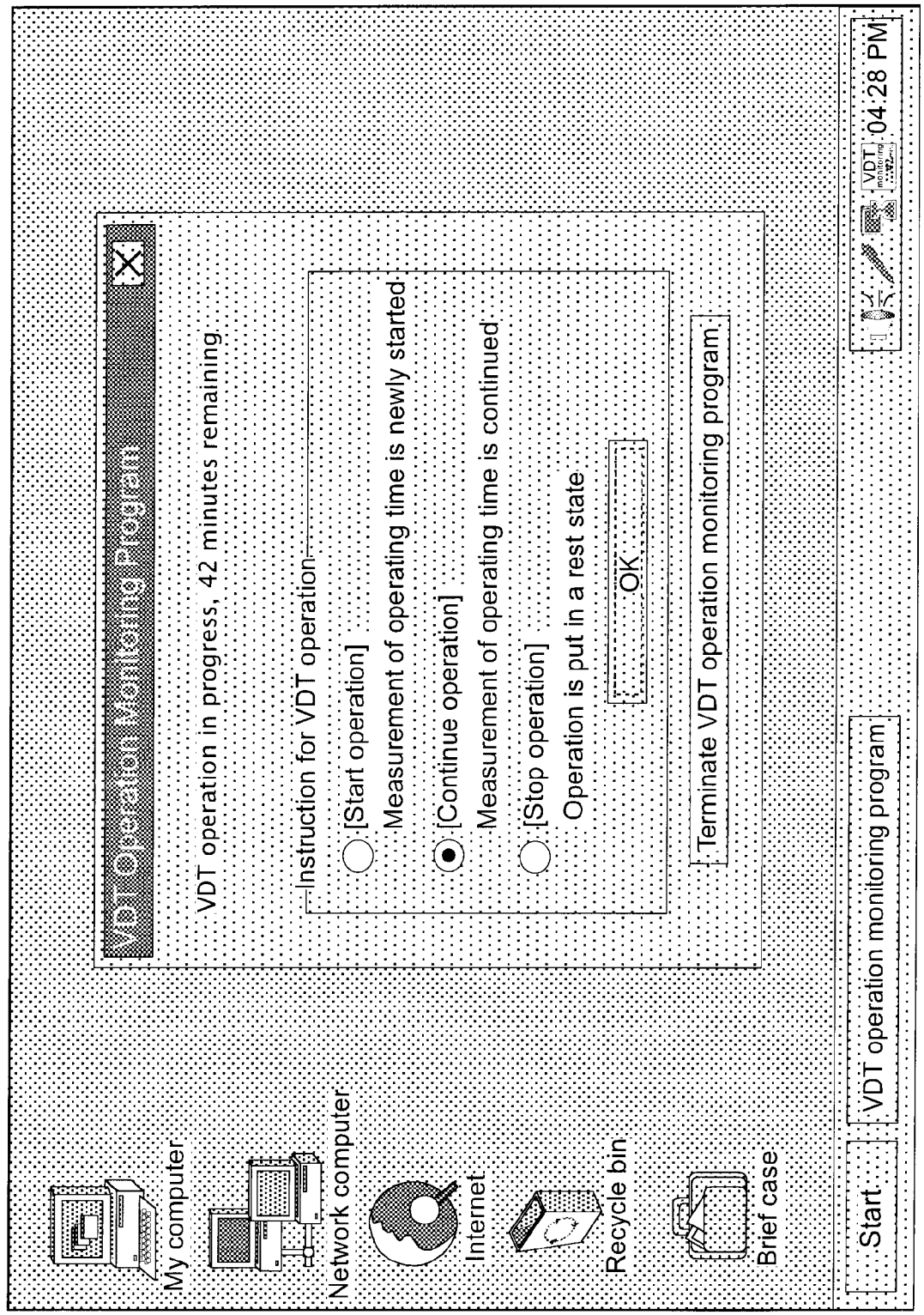
FIG. 4 is a monitoring instruction screen of an embodiment of a VDT operation monitoring program embodying the invention.

When the operator requests a correction of the operating time, or an interruption of the time measurement during the VDT operation, the process proceeds from step $S_3$ to step $S_4$ upon a click on the icon of the VDT operation monitoring program with the mouse to display a monitoring instruction screen as shown in FIG. 4 (the process returns to step $S_2$ from step $S_3$ when no instruction is made by the operator).

The monitoring instruction screen shown in FIG. 4 displays the remaining VDT operating time. The operator can provide the VDT operation monitoring program with any of operational instructions, i.e., starting, continuing and stopping of the VDT operation and termination of the VDT-based monitoring program using the mouse of keyboard while watching the monitoring instruction screen. When the operator instructs starting of the VDT operation, the VDT operation monitoring program returns to step $S_1$ to cause the time measuring means 16 to start the count down from the beginning.

When continuation of the VDT operation is instructed, the process returns to step $S_2$ to continue the measurement of the VDT operating time with the time measuring means 16. When it is instructed to stop the VDT operation, the process proceeds to step $S_6$ to be described later. When it is instructed to terminate the VDT operation monitoring program, the VDT operation monitoring program terminates its operation. In any case, the VDT operation monitoring program (monitoring instruction screen) is represented by an icon on the task bar after the operation is selected.

When the time measuring means 16 has measured the preset operating time (one hour in this case), the control means 22 detects it and puts the VDT in a rest state.

Figure 2:
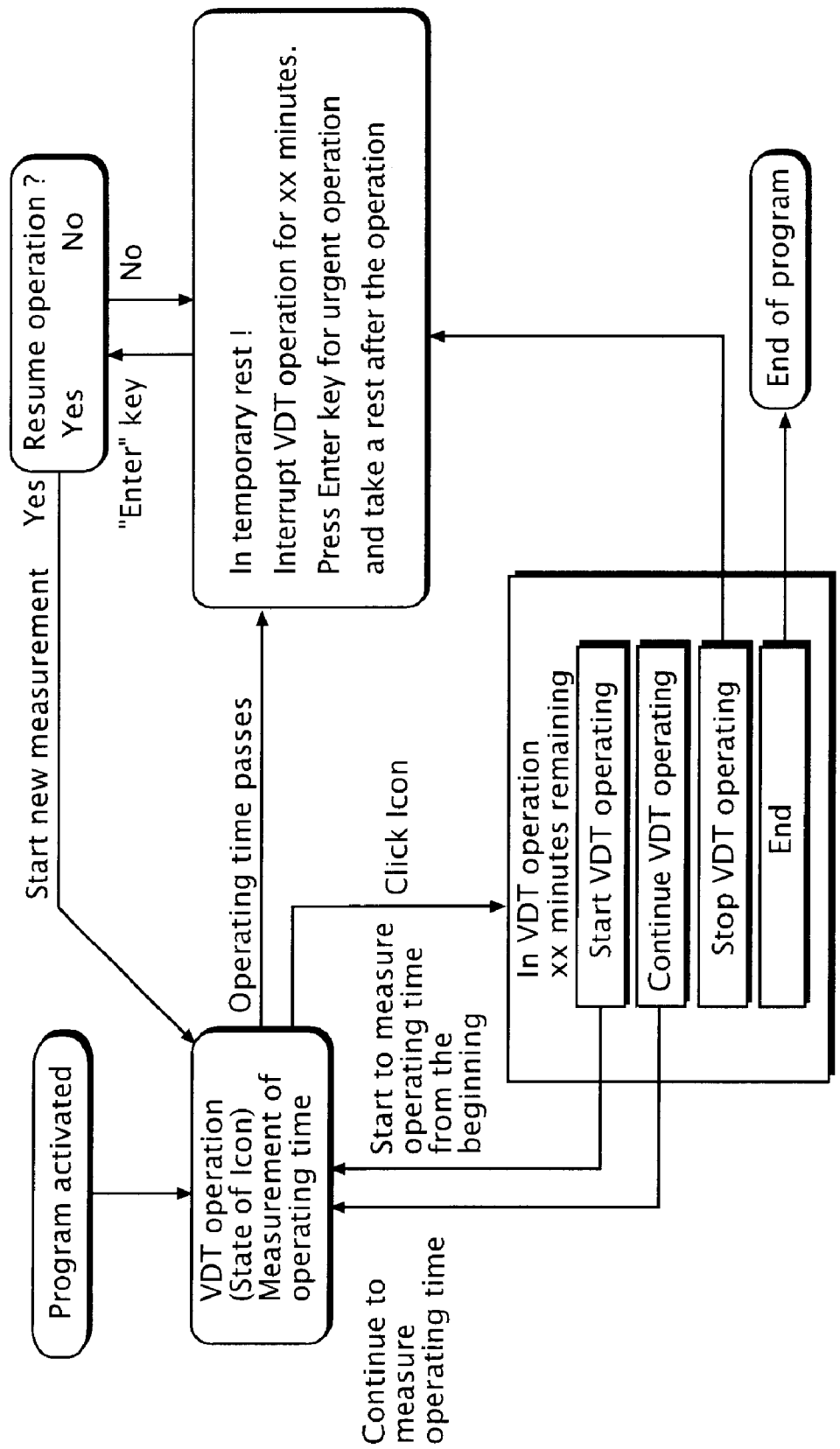
FIG. 2 is a state transition diagram of an embodiment of a method for monitoring a VDT operation according to the invention.
Figure 3:
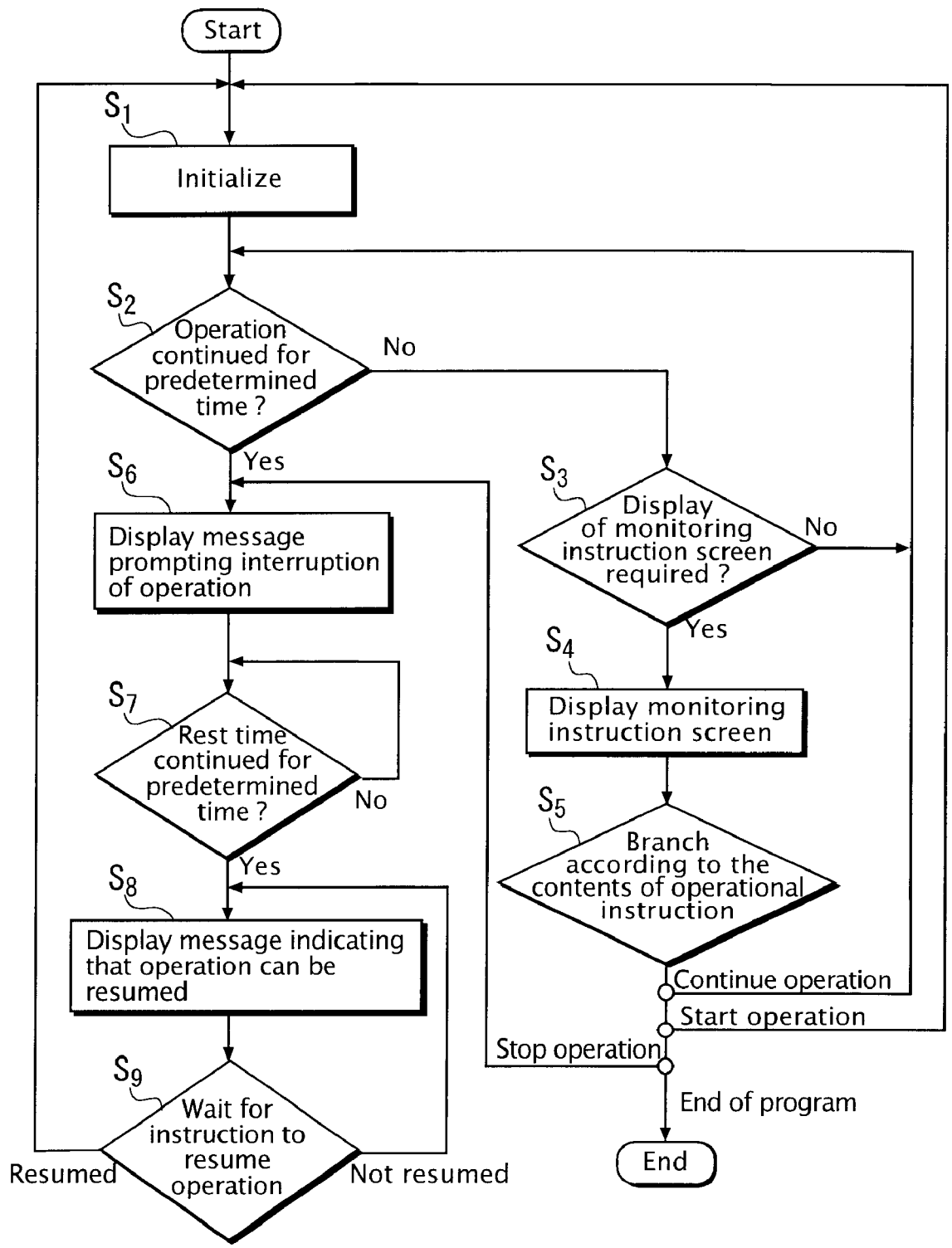
FIG. 3 is a flow chart of an embodiment for illustrating the operation according to a method for monitoring a VDT operation of the invention.

A rule is made to inhibit any operator from performing any operation utilizing the DVT in the rest state, and the notification means 18 displays a message prompting a temporary interruption of the operation on the VDT screen as indicated in the state transition diagram of FIG. 2.

The operator can recognize from the message that a predetermined operating time has passed since the beginning of the operation and can take a rest for a predetermined rest time. The operation can be resumed forcibly if it is an urgent operation. In this case, as shown in the state transition diagram of FIG. 2, the operator can continue the operation, for example, by pressing the "Enter" key on the keyboard to cause the VDT operation monitoring program to proceed to step $S_9$.

After the rest state is entered, the time measuring means 16 is initialized for the rest time and, thereafter, the process proceeds to step $S_7$ at which the time measuring means 16 starts measuring the rest time.

When the time measured by the time measuring means 16 reaches the preset rest time, the controller 22 detects the end of the time to be measured, and the process proceeds to step $S_8$ at which a message prompting input of an instruction for the resumption of the operation is displayed on the VDT screen as shown in the state transition diagram of FIG. 2. Thereafter, the process proceeds to step $S_9$ to enter a standby state that lasts until the operator instructs the resumption of the operation.

When the operator does not wishes to resume the operation and selects "NO", the VDT operation monitoring program returns to step $S_6$ to display a message prompting a temporary interruption of the operation and enters a standby state at step $S_9$.

When the rest state is entered, the time measuring means 16 is initialized for the rest time and, thereafter, the process proceeds to step $S_7$ at which the time measuring means 16 starts measuring the rest time.

When the operator wishes to resume the operation and selects "YES", the process proceeds to step $S_1$ at which the VDT operation monitoring program itself is initialized, and the process is then repeated in the same procedure as described above.

Since the process stands by until the operator gives an instruction once the rest time has passed, it is possible to freely determine the point in time to resume the operation or the point in time to start the operation with the operator replaced.

The above description has given fundamentals of the apparatus and method for monitoring a VDT operation according to the invention. The invention is not limited to the above-described embodiment and, for example, the VDT operating time, and rest time may be freely changed from one hour, and fifteen minutes, respectively. When the invention is implemented using software as a VDT operation monitoring program as in the above-described embodiment, no limitation is placed on the operating system on which the VDT operation monitoring program is to operate.

While a detailed description has been made on the apparatus and method for monitoring a VDT operation according to the invention, the invention is not limited to the above-described embodiment and may obviously be improved and modified in various ways without departing the principle of the invention.

As described above in detail, the apparatus and method for monitoring a VDT operation according to the invention make it possible for an operator not only to know a VDT operating time and rest time for reliable health case but also to change the contents of the operation by selectively switching starting, continuing and stopping of the VDT operation in accordance with the requirement of the operator. This makes it possible for an operator to measure the VDT operating time and rest time reliably even in case of the replacement of operators and to continue an urgent operation when needed.

What is claimed is:

1. A VDT operation monitoring apparatus, comprising:
   time measuring means for measuring time;
   control means for detecting time measured by said time measuring means; and
   notification means for providing notification of desired information under the control of said control means, wherein said control means puts a VDT in a rest state when a preset operating time has passed, said notification means provides predetermined notification when the VDT is put in the rest state, said time measuring means measures the time after said VDT is put in the rest state and said control means inhibits a VDT operation while the time reaches a predetermined rest time since the beginning of the rest state.

2. A VDT operation monitoring apparatus according to claim 1, wherein said control means puts said VDT operation monitoring apparatus in a rest state when said selection to stop an operation is made.

3. A VDT operation monitoring apparatus according to claim 2, wherein said control means causes said notification means to provide a notification of the fact that a time measured by said time measuring means has exceeded a preset time to rest.

4. A VDT operation monitoring apparatus according to claim 3, wherein said operation selecting means allows a selection as to whether an operation is to be resumed or not when a preset time to rest has passed.

5. A VDT operation monitoring apparatus according to claim 1, comprising an electronic apparatus including a VDT and a software program operating on said electronic apparatus.

6. A VDT operation monitoring apparatus according to claim 1, further comprising:
   operation selecting means for allowing any one of the states of starting, continuing or stopping an operation to be selected by an operator while said time measurement is being detected, wherein said control means for determining the state of said VDT in accordance with the selection.

7. A method for monitoring a VDT operation, comprising the steps of:
   measuring a time during which a VDT is in operation;
   putting said VDT in a rest state when the measured time exceeds a preset operating time;
   providing predetermined notification to the VDT display when said VDT is in the rest state;
   measuring the time after said VDT is put in the rest state; and
   inhibiting a VDT operation while the time reaches the predetermined rest time since the beginning of the rest state.

8. A method for monitoring a VDT operation according to claim 7, wherein the VDT is put in a rest state when said selection to stop the operation is made.

9. A method for monitoring a VDT operation according to claim 8, comprising the steps of:
   measuring time after said rest state is entered; and
   causing the VDT to indicate the fact that the time has exceeded a preset rest time.

10. A method for monitoring a VDT operation according to claim 9, comprising the step of:

allowing the operator to make a selection as to whether to resume the operation when said rest time has passed.

11. A method for monitoring a VDT operation according to claim 7, further comprising the step of:

allowing an operator to select any one of the alternatives of initializing, continuing or stopping the measuring of time by the requirement of the operator while said time measurement is being detected.

12. A recording medium for storing a method for monitoring a VDT operation, comprising the steps of:

measuring a time during which a VDT is in operation;

putting said VDT in a rest state when the measured time exceeds a preset operating time;

allowing an operator to select any one of the alternatives of starting, continuing or stopping the operation; and determining the state of said VDT in accordance with the selection.

\* \* \* \* \*